April 22, 1969     T. C. FARRELL     3,439,538
TEMPERATURE COMPENSATING APPARATUS FOR FLUID FLOW METERS
Filed June 21, 1966
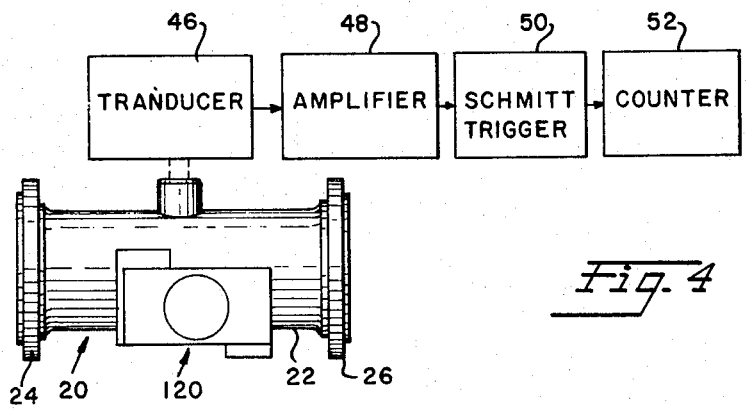
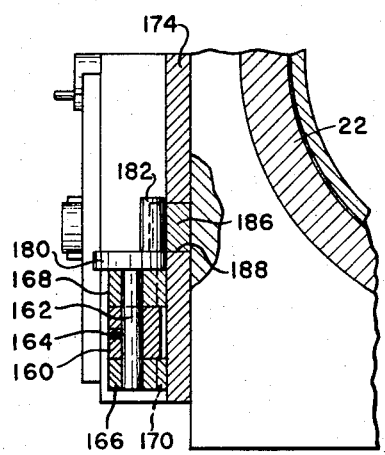
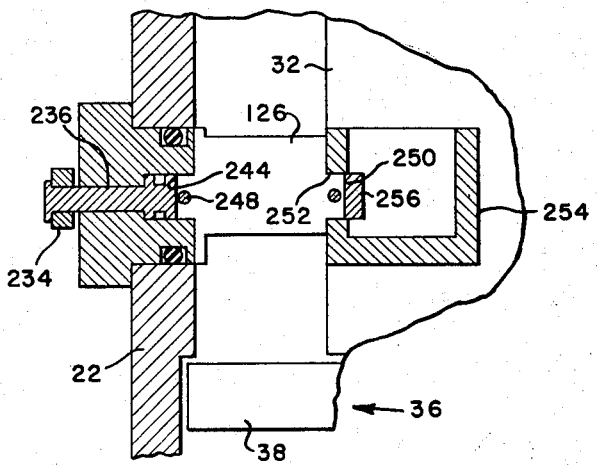
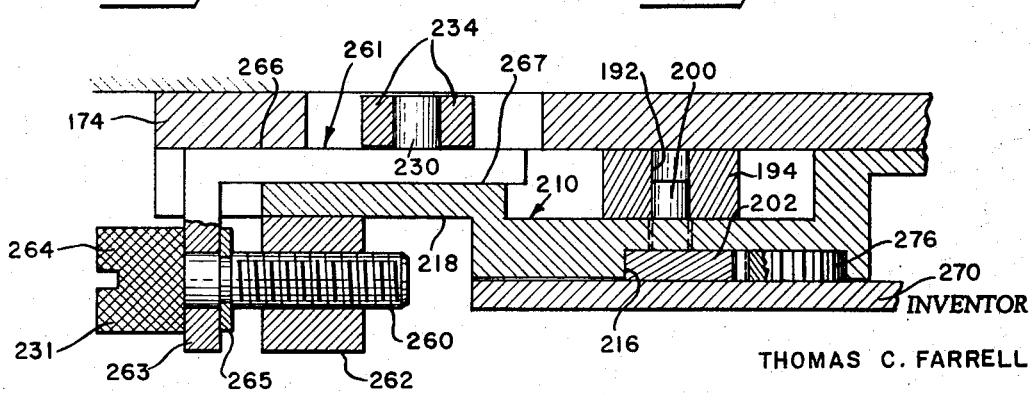
INVENTOR
THOMAS C. FARRELL

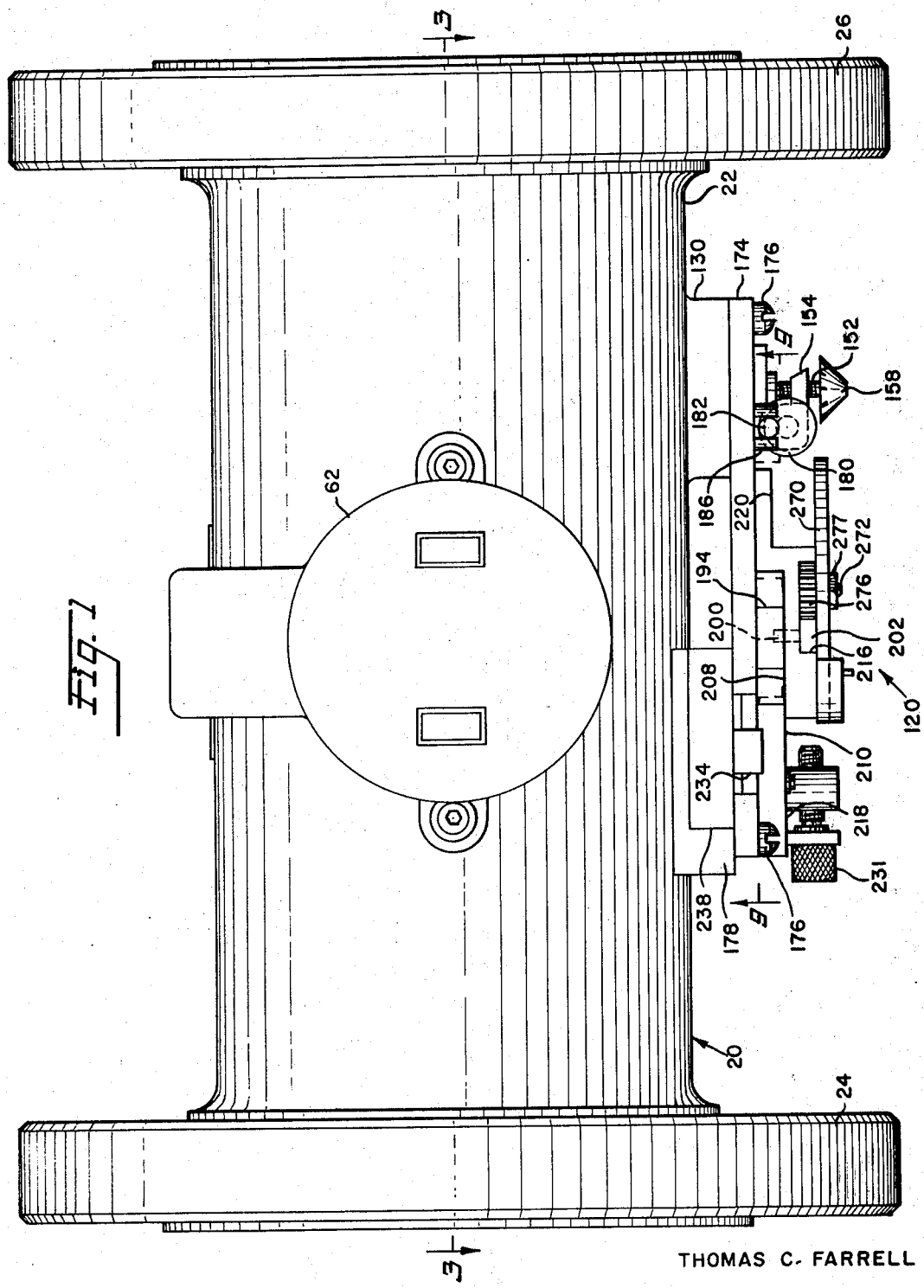

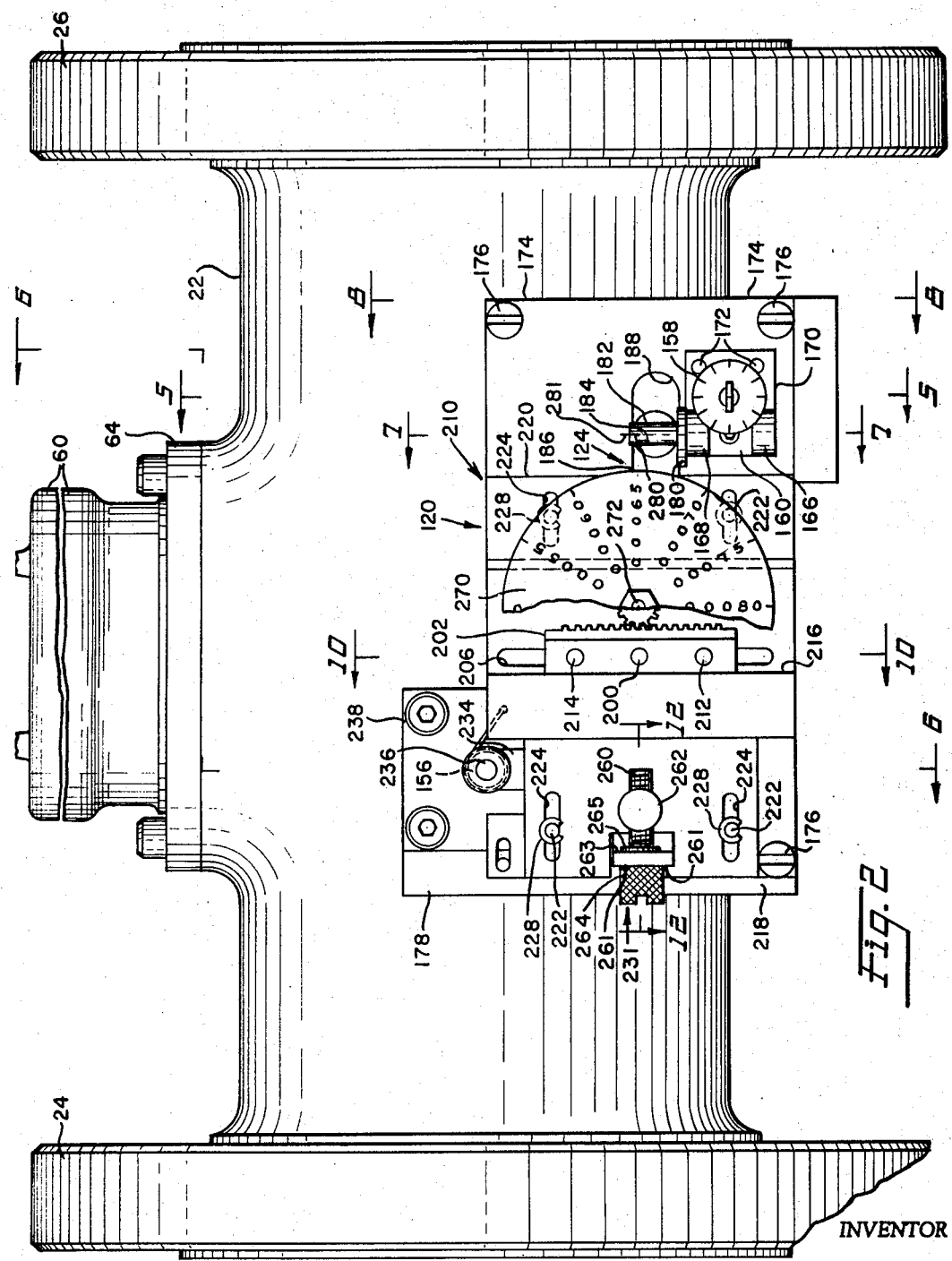

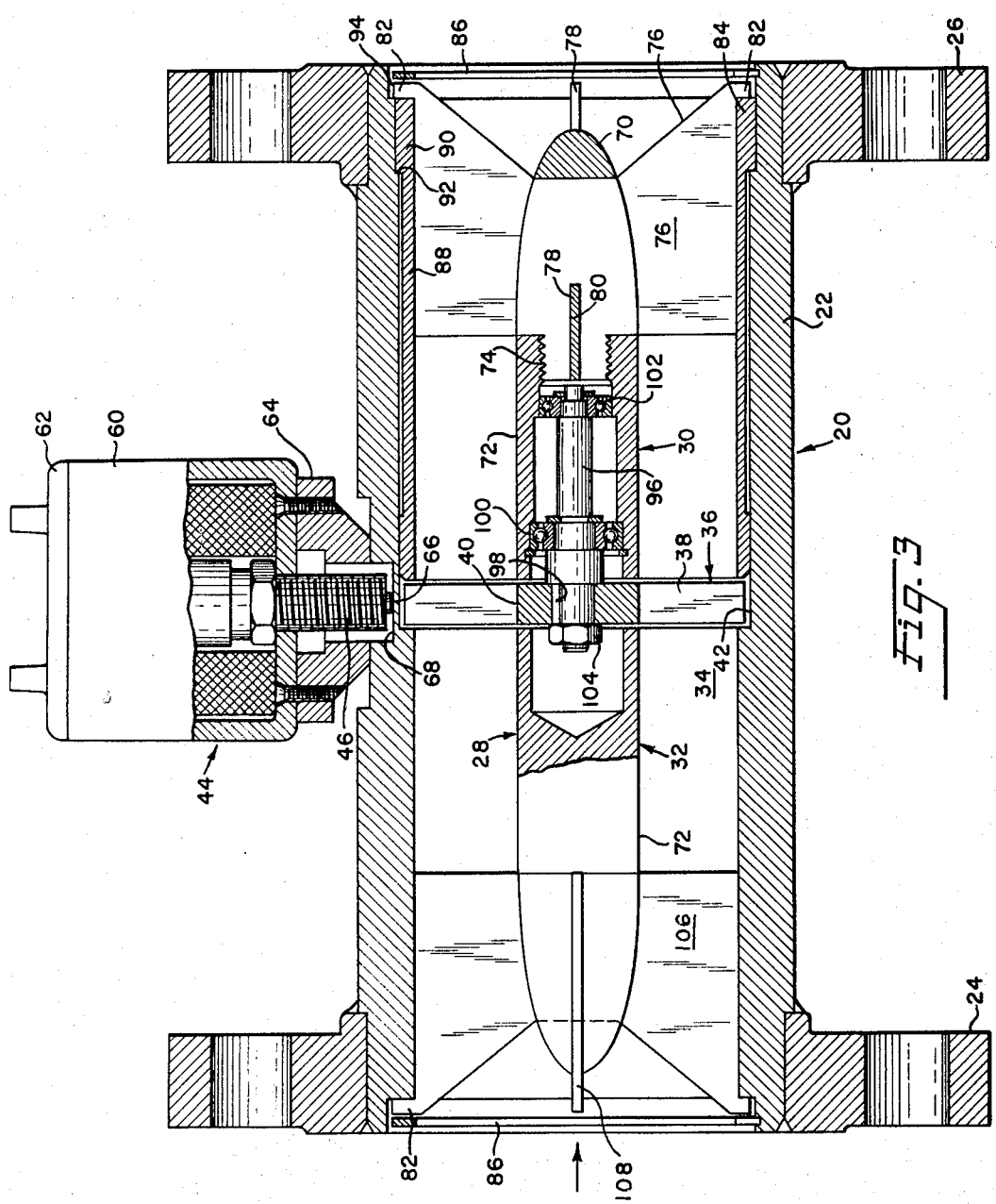

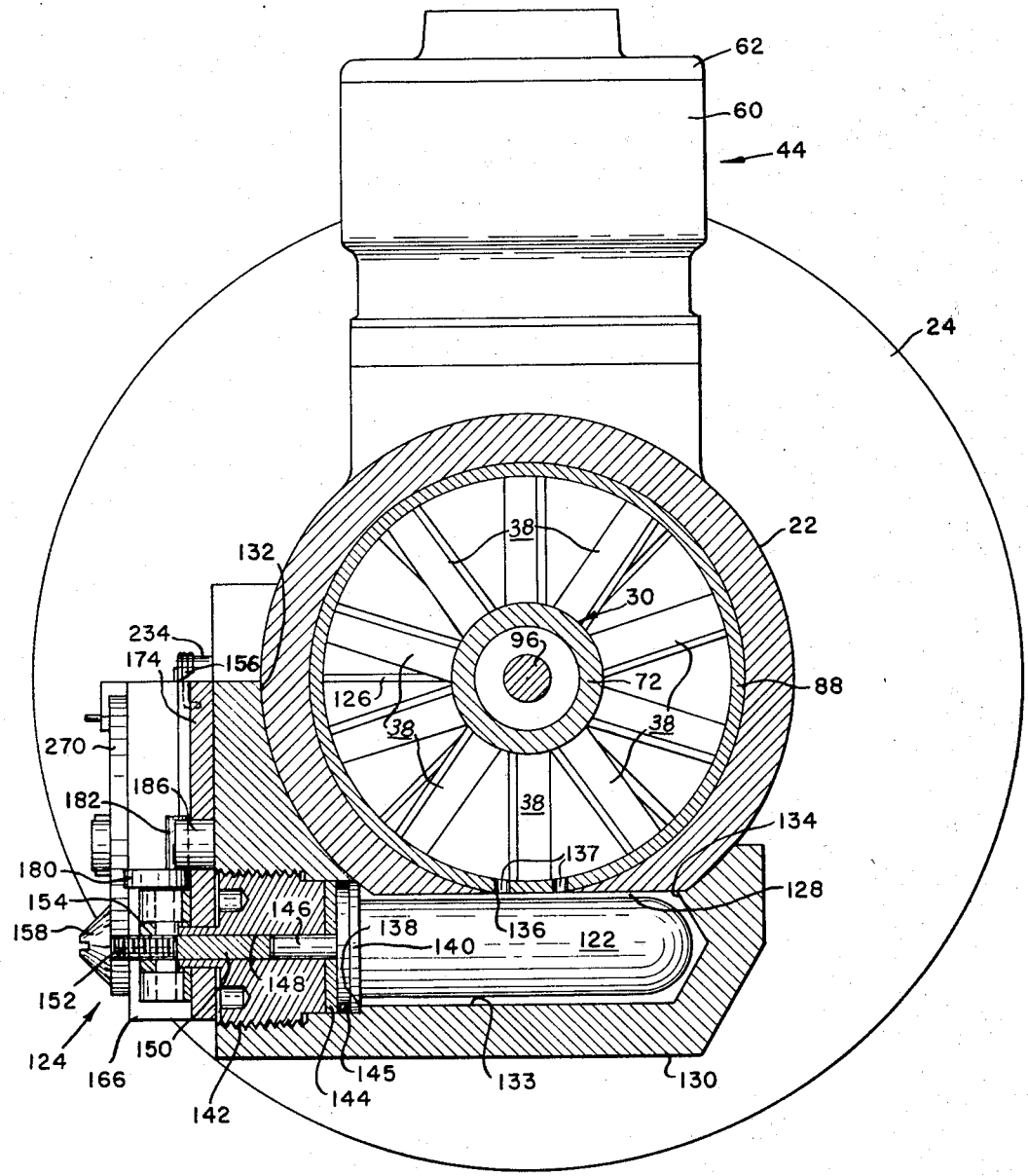

April 22, 1969 T. C. FARRELL 3,439,538
TEMPERATURE COMPENSATING APPARATUS FOR FLUID FLOW METERS
Filed June 21, 1966

INVENTOR
THOMAS C. FARRELL

United States Patent Office 3,439,538
Patented Apr. 22, 1969

3,439,538
TEMPERATURE COMPENSATING APPARATUS FOR FLUID FLOW METERS
Thomas C. Farrell, Glenshaw, Pa., assignor to Rockwell Manufacturing Company, Pittsburgh, Pa., a corporation of Pennsylvania
Filed June 21, 1966, Ser. No. 559,163
Int. Cl. G01f 1/08
U.S. Cl. 73—230                                      22 Claims

ABSTRACT OF THE DISCLOSURE

A fluid flow meter temperature compensating mechanism comprising one or more movable guide vanes disposed in the path of fluid approaching a fluid-driven, rotatable metering rotor and operatively connected by a motion-transmitting linkage to a temperature sensing element whereby the positions of the vanes are correlated with respect to the fluid temperature sensed by the element to control the velocity of the rotor by controlling the direction of fluid flowing past the rotor. Three adjustments are provided for: one for adjusting the magnitude of vane displacement for a given temperature variation to facilitate the measurement of fluids having different coefficients of expansion; another for adjusting the vane position relative to the motion-transmitting linkage and temperature sensing element to calibrate the meter; and a third for unitarily adjusting the vanes and linkage to positions corresponding to the actual temperature of the fluid being metered to facilitate meter calibration with the first-mentioned adjustment.

---

This invention relates to fluid flow meters and is particularly concerned with a novel temperature compensating mechanism for the type of volumetric flow meters having a fluid driven metering rotor which operates a register or the like.

When fluid being measured by a volumetric flow meter is subject to temperature variations, it frequently is desirable to provide some form of temperature compensating apparatus for automatically correcting the volumetric measurements to a reference temperature. In this way, the meter readings more accurately reflect the mass of fluid measured by the meter.

This invention is particularly concerned with the type of temperature compensating mechanisms wherein one or more flow deflecting vanes, which are operatively connected to a temperature sensing element, are positioned by fluid temperature variations to control the rotational speed of the metering rotor. In this way, the number of rotor revolutions can be made to more closely correspond to the volume that the measured fluid would have at a predetermined reference temperature.

A primary object of this invention is to provide a novel and improved motion transmitting linkage for operatively connecting the temperature sensing element to the fluid flow deflecting vane in the type of temperature compensating mechanism described above.

Another object of this invention is to provide a novel temperature compensating mechanism of simplified, easy to assemble construction which may conveniently be adapted to a meter without major modification to the meter structure or design. The temperature compensating mechanism of this invention therefore may optionally be added to meters of existing design without major expense.

Still another object of this invention is to provide a fluid flow meter with a novel temperature compensating mechanism in which the motion transmitting linkage operatively connecting the vane and temperature sensing elements mentioned above is located on the exterior of the meter housing and thus is not subject to malfunction by contact with the fluid being metered. With this arrangement, the various adjustments needed for operation and calibration may be of simplified construction owing to their readily accessible locations.

A further object of this invention is to provide a fluid flow meter with a novel temperature compensating mechanism which has three independent adjustments for calibrating the meter, for metering fluids having different viscosities, and for changing the reference temperature to which the fluid flow measurements are corrected.

Further objects of this invention will appear as the description proceeds in connection with the appended claims and annexed drawings wherein:

FIGURE 1 is a plan view of an axial flow turbine meter incorporating the temperature compensating mechanism of this invention;

FIGURE 2 is a side elevation of the meter shown in FIGURE 1;

FIGURE 3 is a section taken substantially along lines 3—3 of FIGURE 1;

FIGURE 4 is a view schematically showing the electronic pick-up and registration circuitry for the meter of FIGURES 1 and 2;

Figure 6:
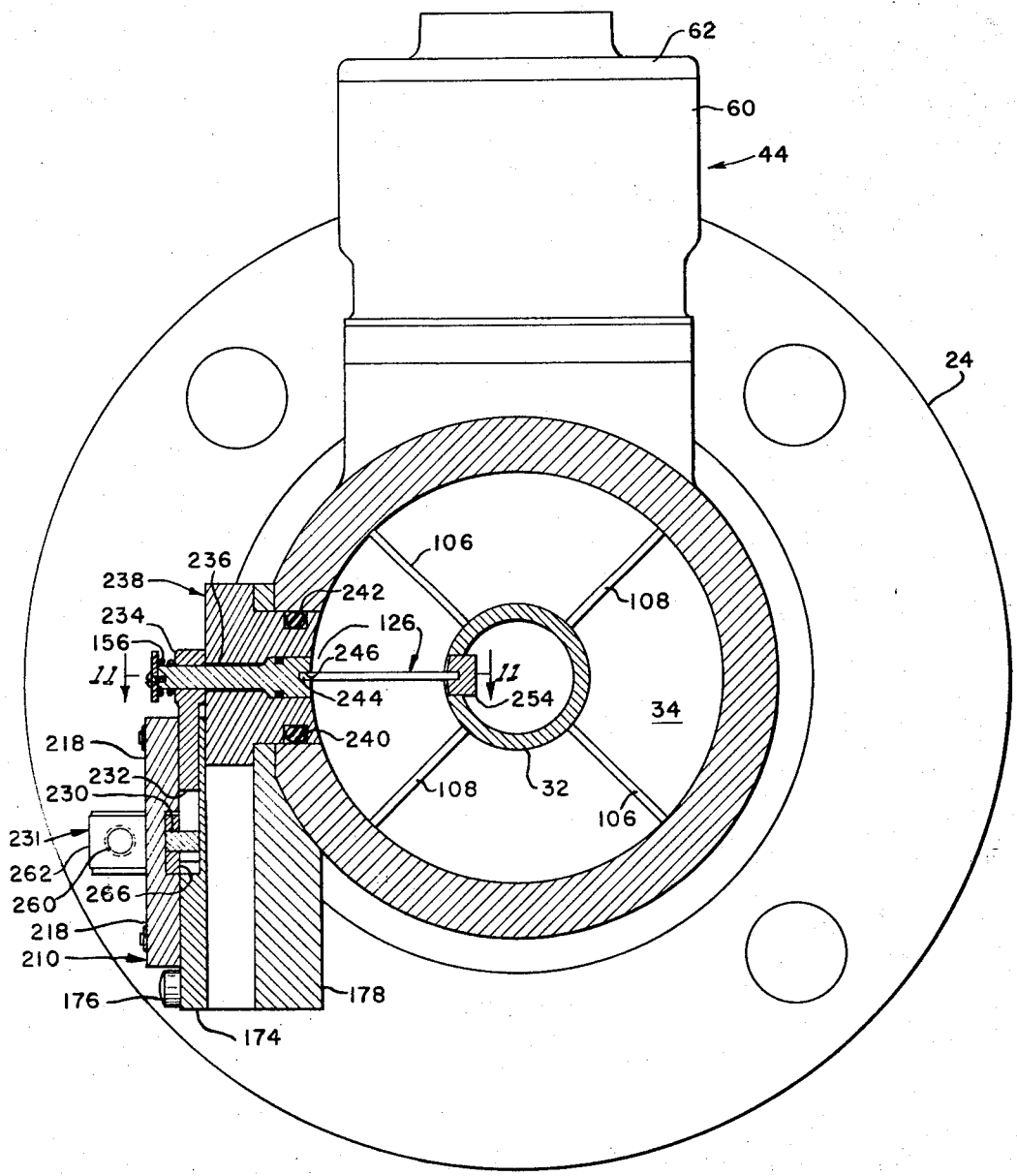
Figure 9:
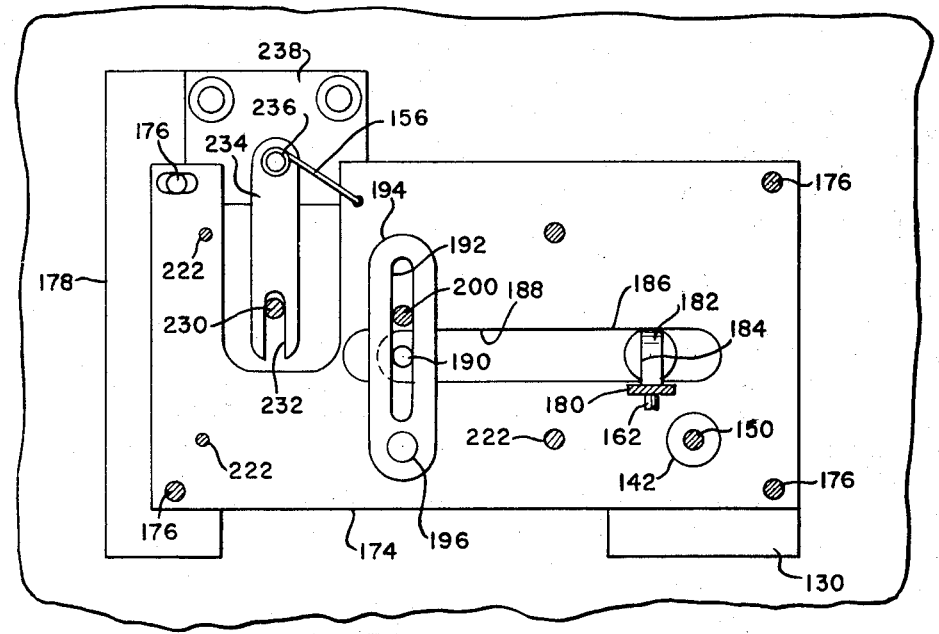
Figures 8, 10:
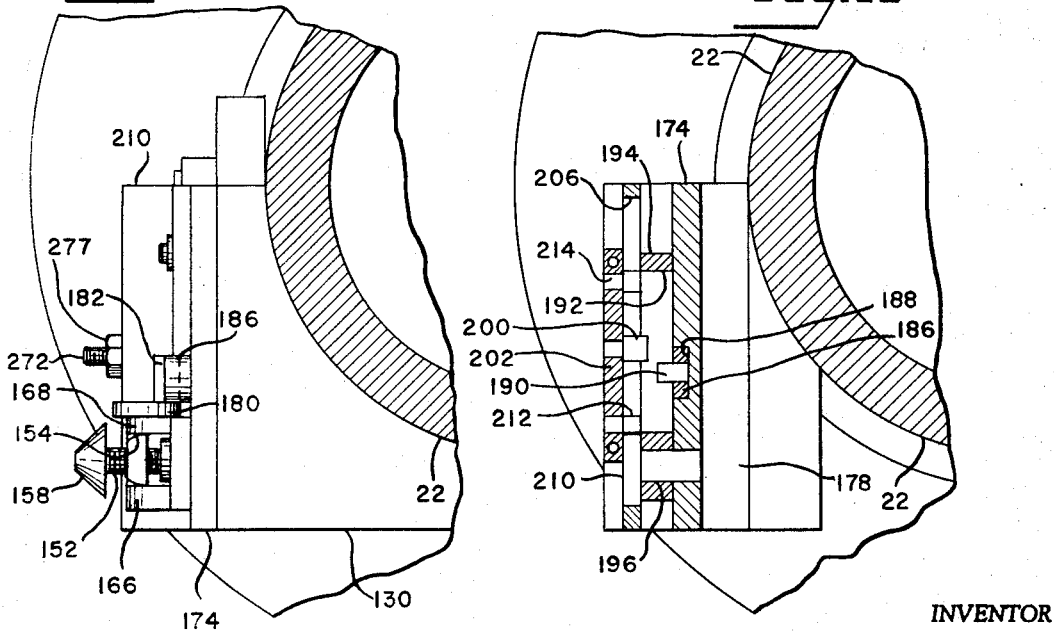

FIGURES 5, 6, 7, and 8 are sections taken substantially along lines 5—5, 6—6, 7—7, and 8—8 of FIGURE 2;

FIGURE 9 is a section taken substantially along lines 9—9 of FIGURE 1;

FIGURE 10 is a section taken substantially along lines 10—10 of FIGURE 2;

FIGURE 11 is a section taken substantially along lines 11—11 of FIGURE 6; and

FIGURE 12 is a section taken substantially along lines 12—12 of FIGURE 2.

Referring now to the drawings and more particularly to FIGURES 1–3, the reference numeral 20 generally designates an axial flow turbine meter incorporating the principles of this invention and comprising a metallic, generally tubular housing 22 to which pipe attachment flanges 24 and 26 are fixed at opposite ends. Coaxially mounted in housing 22 is a fluid guide structure 28 comprising axially aligned, spaced apart, faired core assemblies 30 and 32 which cooperate with housing 22 to form an annular fluid flow passage or channel 34. Passage 34 extends between the meter inlet end at flange 24 and the meter outlet end at flange 26.

All of the fluid to be metered flows through passage 34 to drive a peripherally bladed turbine metering rotor 36 (see FIGURE 3) which is mounted axially between core assemblies 30 and 32 for rotation about an axis extending in coaxial relationship with that of housing 22. Rotor 36 is provided with a plurality of equiangularly spaced apart, preferably straight blades 38 which are fixed to and extend radially from a rotor hub 40 at a predetermined angle to the longitudinal axis of the meter. Blades 38 are relatively long and extend completely across passage 34 into an annular, uninterrupted, inwardly opening recess 42. The primary function of recess 42, which circumferentially surrounds rotor 36 to receive the tips of blades 38, is described in detail in Patent No. 3,248,944.

Rotation of rotor 36 is detected by a pick-up unit 44 comprising an inductance type electrical signal transducer 46 having output terminals electrically connected to the input of an amplifier circuit 48 (see FIGURE 4). The output of circuit 48 is electrically connected to the input of a Schmitt trigger or squaring circuit 50 whose output is, in turn, electrically connected to a suitable, electrically actuatable totalizing counter 52 of conventional form.

Pick-up unit 44, amplifier circuit 48, and trigger 50 may be of any suitable, conventional form, but preferably are the same as that described in the commonly assigned copending application Ser. No. 348,153 filed on Feb. 28, 1964 for "Fluid Meter."

As shown in FIGURE 3, pick-up unit 44 is exteriorly mounted on housing 22 and comprises an essentially cup-shaped, nonmagnetic casing 60 having a cover 62. Casing 60 is suitably fixed to a mounting plate 64 which is secured to housing 22.

Transducer 46 has an operating core 66 which extends into an outwardly opening housing recess 68 and which is in radial alignment with rotor blades 38. Blades 38, which are preferably made from stainless steel, are magnetic to vary the flux density in core 66 when rotation is imparted to rotor 36 by flow of fluid through passage 34. In response to these flux density variations, an electrical voltage is induced into the inductance coil (not shown) of transducer 46. As a result, the transducer output will be a sinusoidal wave whose frequency and amplitude are directly proportional to the angular velocity of rotor 36. This undulating signal is fed to the input of amplifier circuit 48. The amplified output of circuit 48 fires trigger 50.

The output of trigger 50, as is well known, is an essentially square wave having a substantially constant amplitude. This signal is transmitted to actuate counter 52. The number of pulses emitted by trigger 50 is proportional to the number of revolutions made by rotor 36. The number of pulses generated by trigger 50 thus is closely proportional to the volume of the fluid which has passed through the meter.

As best shown in FIGURE 3, core assembly 30 is generally of hollowed out configuration and comprises a nose cap 70 and a generally tubular section 72. Nose cap 70 has a gradually converging cross section for smoothly guiding fluid to be metered through the outlet end of housing 22 and smoothly merges with tubular section 72 which is of uniform external diameter. As its downstream end, tubular section 72 is threaded onto a boss section 74 of nose cap 70.

The assembly of nose cap 70 and tubular section 72 is supported in housing 22 by a pair of mutually perpendicular, radially extending, relatively thin, flat-sided plates 76 and 78. Plates 76 and 78 extend through straight-sided slots which are formed in nose cap 70.

As shown, plates 76 and 78 are formed with opposed, interengaging axially extending slots 80 so as to be non-rotatably secured together in internested relationship. In assembled relation, plates 76 and 78 are clamped against axial movement and extend radially across passage 34. The outer ends of plates 76 and 78 terminates in small radial tabs 82 which fit into a stepped, counterbored recess 84. Recess 84 is formed in housing 22 radially inwardly of flange 26. Tabs 82 are axially clamped between a groove-seated retainer ring 86 and a sleeve 88. Sleeve 88 is coaxially received in housing 22 and is provided at its outer end with a diametrically enlarged section 90 which abuts an annular shoulder 92 in housing 22. At least one of the tabs 82 extends into an inwardly opening groove 94 which is formed in housing 22 to prevent assembly 30 and plates 76 and 78 from rotating. With this construction, it is clear that core assembly 30 is fixed in place within housing 22.

Still referring to FIGURE 3, rotor 36 is non-rotatably fixed on a short shaft 96 as by a key 98. Shaft 96 is coaxially, rotatably supported in tubular section 72 by axially spaced apart, anti-friction ball bearing assemblies 100 and 102. Shaft 96 extends through hub 40 and terminates in a threaded section which receives a nut 104 that axially retains rotor 36 in place.

The construction of core assembly 32 is preferably the same as that of core assembly 30. Accordingly, like reference numerals have been used to identify like parts. A mutually perpendicular pair of thin flat-sided plates 106 and 108, which are of the same construction as plates 76 and 78, support core assembly 32 in housing 22. Plates 106 and 108 are mounted in the same manner as plates 76 and 78.

Without temperature compensation, the angular velocity of rotor 36 and, consequently, the number of pulses generated by trigger 50 will vary in accordance with temperature variations of the fluid being metered. The reason for this is that, at a given mass flow rate, the specific volume of the fluid changes with the fluid temperature, and changes in the specific volume produces corresponding changes in the axial velocity of the fluid passing the rotor blades. Such changes result in corresponding variations of the rotational speed of the rotor to thus vary the number of pulses generated by trigger 50.

According to this invention a temperature compensating mechanism 120 (see FIGURES 1 and 2) is provided to control the angular velocity of rotor 36 and hence the number of electrical pulses generated by trigger 50. Mechanism 120, as shown in FIGURES 1–3, 5 and 6, comprises a temperature sensitive bulb 122 (see FIGURE 5) which is connected by a special motion transmitting linkage assembly 124 to a fluid flow deflecting vane 126. Bulb 122 contains a suitable fluid which expands and contracts in response to temperature variations of fluid flowing through housing 22 to control the position of vane 126. Vane 126, as will be described in greater detail later on, is mounted in passage 34 immediately upstream from rotor 36 and is swingable about an axis normally intersecting the rotor rotational axis to control the direction of fluid approaching rotor blades 38. By so controlling the incidence of the fluid with respect to blades 38, the angular velocity of rotor 36 will be varied in accordance with the fluid temperature variations sensed by bulb 122.

As shown in FIGURE 5, bulb 122 is coaxially received in a cylindrically walled chamber 128 which is formed by a bulb support housing 130. Housing 130 is suitably fixed as by welding to housing 22 and is formed with an inwardly facing arcuate surface 132 which interfittingly seats against the periphery of housing 22. Chamber 128 is defined by a blind bore 133 formed in housing 130 along an axis that extends at right angles to the rotational axis of rotor 36. As shown, bore 133 is on the downstream side of rotor 36. Chamber 128 is in direct fluid communication with the interior of housing 22 through aligned openings 134, 136 and 137, which are respectively formed in housing 22, housing 130, and sleeve 88. Fluid passing through rotor 36 thus enters chamber 128 and peripherally surrounds bulb 122.

Still referring to FIGURE 5, bore 133 is stepped to define an outwardly facing, annular shoulder 138 near its open end. Bulb 122 is provided at its outer end with an annular land 140 which is seated against shoulder 138 to limit inward displacement of the bulb structure. A cap 142 threaded into the outer end of bore 133 seats a washer 144 against the outwardly facing end of bulb 122. Bulb 122 is thus axially confined between washer 144 and shoulder 138 and is removable from chamber 128 simply by unthreading cap 142. A resilient O-ring 145 carried by the forward end of bulb 122 provides a fluid tight seal to prevent the escape of fluid through the open end of bore 133.

With the continued reference to FIGURE 5, bulb 122 is of any suitable, conventional form having a stem 146 which is axially displacable by expansion and contraction of the temperature sensitive fluid in the bulb. Stem 146, which slidably extends into a bore 148 formed through cap 142, separably bears against the end of a cylindrical spacer pin 150. Pin 150 is also slidably received in bore 148 and forms a part of assembly 124 which will now be described.

Referring to FIGURES 1, 2, and 5, assembly 124 is shown to comprise an adjusting screw 152 which is threaded through an arm 154 to butt against the outer end of pin 150. Assembly 124, as will be described in detail shortly, is biased by a spring 156 (see FIGURE 2) to maintain screw 152 in abutment with pin 150 and to maintain pin 150 in abutment with stem 146. All of the components of assembly 124 thus move unitarily with axial displacement of stem 146.

The outer end of screw 152 is provided with a dial 158 having graduations which are used as a reference for calibrating mechanism 120 in a manner to be explained in detail later on.

As best shown in FIGURE 7, arm 154 is integrally provided with a collar 160 through which a cam shaft 162 coaxially extends. Collar 160 is fixed on shaft 162 by a set screw 164. Shaft 162 is journalled at opposite ends in aligned holes which are formed through parallel ears 166 and 168. Ears 166 and 168 are integral with a bracket plate 170 which is suitably fixed as by screws 172 (see FIGURE 2) to a rigid flat-sided support plate 174. The rotational axis of shaft 162 is contained in a plane which extends at right angles to the aligned longitudinal axes of stem 146 and pin 150. Axial displacement of stem 146 thus imparts rotation to shaft 162 through the motion transmitting connections provided by pin 150, screw 152, arm 154 and collar 160.

Support plate 174 is fixed by screws 176 to housing 130 and to a support block 178. Block 178 is suitably fixed to housing 22 as by welding.

As best shown in FIGURES 2, 7, and 8, the upper end of shaft 162 is fixed to a cam 180 which mounts an eccentric crank pin 182. The axis of pin 182 is parallel to, but laterally offset from the axis of shaft 162. Rotation of shaft 162 thus swings pin 182 around the shaft axis.

Pin 182 extends upwardly through a slot 184 which is formed in a link 186. Link 186 is slidably received in a forwardly opening, horizontally extending, flat bottom groove 188 formed in support plate 174. Rotation of shaft 162 in opposite directions thus imparts reciprocal movement to link 186 through the engagement of pin 182 in slot 184. The straight side walls of slot 188 guide link 186 for displacement along a straight path which extends at right angles to the axes of shaft 162 and stem 146.

A pin 190, as shown in FIGURES 9 and 10, is mounted on the opposite end of link 186 and extends through a slot 192 along an axis that is parallel to that of stem 146. Slot 192 is formed in a link 194 which is pivoted at its lower end on a rigid post 196. Post 196 is fixed to support plate 174 and extends forwardly along an axis that is parallel with the longitudinal axes of pin 190 and stem 146. Reciprocation of link 186 pivots link 194 about the axis of post 196 through the engagement of pin 190 with the opposed, parallel side edges of slot 192.

Referring to FIGURES 1, 2, and 10, a pin 200, which is fixed to a rack 202, extends into slot 192 along an axis that is parallel with the pivot axis of link 194. The forward end of pin 200 extends through a vertical slot 206 which is formed in an offset section 208 (see FIGURE 1) of a reciprocable, motion transmitting plate 210. Slot 206 is elongated in a direction which extends at right angles with respect to the direction of elongation of groove 188 and hence with respect to the path in which link 186 is reciprocated. Pin 200 is fixed to rack 202 about midway between two shorter pins 212 and 214 which are fixed to opposite ends of rack 202 and which extend into slot 206. Pins 212 and 214 confine rack 202 to movement only along slot 206 and thus in a direction which is at right angles to the path in which link 186 is reciprocated.

Abutment of pins 212 and 214 respectively with the opposed ends of slot 206 limit displacement of rack 202. Pins 212 and 214 are parallel with pin 200 and are made sufficiently short so that they do not extend into slot 192. Rack 202 is guided along a straight, flat shoulder 216 which is formed on plate section 208. As will be described in detail shortly, displacement of rack 202 varies the magnitude of displacement of plate 210 relative to that of link 186.

As best shown in FIGURES 1 and 2, plate 210 is formed with end sections 218 and 220 on opposite sides of section 208. Four parallel posts 222, which are fixed to support plate 174, extend forwardly through slots 224 formed two in each of the plate sections 218 and 220. Slots 224 are located near the corners of plate 210 and extend in a direction that is parallel to the direction in which groove 188 is elongated. Posts 222 are parallel with post 196. With this construction, plate 210 is reciprocable along a path which is parallel to that of link 186.

By pivotally displacing link 194 in opposite directions, plate 210 is reciprocated through engagement of pin 200 with the side edges of slots 192 and 206. Displacement of plate 210 is limited by abutment of one or more of the posts 22 with opposed ends of slots 224.

Still referring to FIGURE 2, plate 210 is confined against outward displacement along the axes of posts 222 by retainer rings 228 which are mounted on posts 222. Inward displacement of of plate 210 is prevented by abutment of plate sections 218 and 220 against support plate 174. As plate 210 is reciprocated, plate sections 218 and 220 slide along the front face of support plate 174. Plate section 220 slides over the front face of link 186 which is flat and flush with the front face of support plate 174. Link 194 is confined between opposed flat faces on plate section 208 and support plate 174.

Referring to FIGURES 6 and 9, a pin 230, which is connected to plate section 218 by a motion transmitting, manual adjustment assembly 231, extends into a slot 232 along an axis that is parallel to the pivot axis of link 194. Slot 232 is formed in the lower end of a pivotable link 234. Fixed to the upper end of link 234 is a shaft 236 which is journalled in a gland 238 for rotation about an axis extending parallel to that of pin 230.

Gland 238 is fixed in a lateral opening 240 formed through housing 22 at a region immediately upstream from rotor 36. By reciprocating plate 210, link 234 is pivoted to rotate shaft 236 through engagement of pin 230 with the side edges of slot 232.

A resilient, groove-seated O-ring 242 carried by gland 238 is compressed against the peripheral wall surface of opening 240 to prevent fluid leakage. Shaft 236 also carries a resilient O-ring that provides a fluid-tight seal to prevent fluid leakage through gland 238. The rotational axis of shaft 236 extends radially with respect to the rotational axis of rotor 36.

Vane 126, which is made from stainless steel or other suitable material, is integrally provided with a flat-sided tab 244 (see FIGURES 6 and 11) which extend radially from its outer edge. Tab 244 is interfittingly received in a groove 246 formed in the inner end of shaft 236. A pin 248 extending through aligned holes in the slotted shaft end and tab 244 secures vane 126 to shaft 236. Vane 126 has a second flat-sided tab 250 extending from its inner radial edge and into a slot 252 which is formed in a saddle member 254. Tab 250 radially aligns with tab 244 and is seated at its inner edge on a suitable pivot bearing 256. Bearing 256 is held in member 254 which, in turn, is suitably supported in core 32 immediately upstream from rotor 36.

By rotating shaft 236, therefore, vane 126 is pivoted about a radially extending axis which substantially medially intersects tabs 244 and 250 and which aligns with the rotational axis of shaft 236.

As shown in FIGURES 1, 2, and 12, assembly 231 comprises a screw 260 and an L-shaped, motion transmitting plate 261. Screw 260 is threaded through a post 262 along an axis extending parallel to the path of reciprocable displacement of plate 210 and at right angles to the rotational axis of shaft 236. Post 262 is fixed to plate section 218 and extends forwardly from the front face thereof along an axis normally intersecting the rotational axis of screw 260.

Screw 260 extend through a smooth walled bore in a forwardly extending arm portion 263 of plate 261 and is provided with an enlarged head 264. Arm portion 263 is clamped between head 264 and a split retainer ring 265 so that plate 261 is adjustably fixed to plate 210 through the connections provided by post 262 and screw 260. Plate 261 therefore is moved unitarily with plate 210 during operation.

As best shown in FIGURE 12, plate 261 is integrally formed with a second arm portion 266 which extends at right angles to plate portion 263 and which is sildably disposed in a rearwardly opening groove 267 in plate section 218. Post 230 is fixed to arm portion 266. As a result, reciprocation of plate 210 rocks link 234 and rotates shaft 236 in opposite directions through the connections provided by screw 260 and plate 261.

To manually adjust the position of vane 126, screw 260 is threaded into or out of post 262 depending upon the direction in which it is desired to pivot the flow deflecting vane. When screw 260 is threaded into post 262, for example, plate 261 is moved from left to right as seen from FIGURE 2 to thereby swink link 234 and rotate shaft 236 in a counterclockwise direction. Vane 126 is thus pivoted in the same direction.

It will be appreciated that the manual adjustment of vane 126 by manipulating screw 260 does not result in displacement of plate 210; instead, plate 261 will shift relative to plate 210 so that the setting of vane 126 can be changed selectively without altering the positions of links 194 and 186, shaft 162, and the stem 146 of bulb 122. Manual adjustment of vane 126, therefore, does not affect the calibration afforded by adjusting screw 152 or a viscosity compensating calibration which will soon be described.

Spring 156, which reacts against a rigid surface on the meter housing, biases link 234 in a clockwise direction (as viewed from FIGURES 2 and 9) to urge plate 210 to the left through the connections provided by plate 261 and screw 260. Link 194 is thus biased in a counterclockwise direction as viewed from FIGURE 1. Counterclockwise rotation of shaft 162 urges the inner end of adjusting screw 152 into contact with pin 150. As a result, the inner end of pin 150 is biased into contact with stem 146.

Expansion of fluid in bulb 122 as a result of an increase in temperature of the fluid being metered, displaces stem 146 axially outwardly to rotate shaft 162 in such a direction as to displace link 186 from left to right (as seen from FIGURE 2) against the bias exerted by spring 156. This displacement of link 186 pivots link 194 in a clockwise direction as viewed from FIGURES 2 and 9 to shift plate 210 to the right. Link 234 is thus swung counterclockwise to rotate shaft 236 and pivot vane 126 in the same direction.

It will be appreciated from the foregoing that the angular distance through which vane 126 is swung will be proportional to the amount of axial displacement of stem 146 and thus to the magnitude of temperature variation from a predetermined reference value such as, for example, 60° F. By so adjusting the angular position of vane 126 in response to fluid temperature variations, the direction of upstream fluid entering rotor 36 in the region of vane 126 is correspondingly altered. The incidence angle of the fluid in passing over rotor blades 38 will be substantially the same as the angular position of vane 126 with respect to the rotor rotational axis because the upstream fluid particles have a predetermined axial velocity before reaching vane 126.

By swinging vane 126 in a counterclockwise direction (as viewed from FIGURE 2) in response to a temperature increase in the fluid being metered, the change in incidence angle of the fluid with respect to rotor blades 38 will decrease the angular velocity of rotor 36 for a given flow rate. The number of pulses produced by trigger 50 thus will correspondingly be varied per unit volume of fluid measured.

When a decrease in the temperature of fluid being metered is sensed by bulb 122, vane 126 will be pivoted in the opposite direction to so alter the incidence angle of fluid with respect to blades 38 that the velocity of rotor 36 will increase. The percentage of registration (at counter 52) changes substantially linearly with the angular position of vane 126.

To adjust the temperature compensating mechanism of this invention for measuring fluids with different rates of expansion, a circular, flat-sided dial 270 (see FIGURES 1, 2 and 8) is mounted on a post 272 for selective rotation about an axis extending parallel to post 200 and the pivot axis of link 194. Post 272 is suitably fixed to plate section 208 and extends forwardly through a pinion 276. Pinion 276 is fixed to the back of dial 270 and constantly meshes with the teeth on rack 202. A nut 277 is threaded on the outer end of post 272 to axially retain dial 270 in place.

By selectively turning dial 270, rack 202 is displaced along the elongated axis of slot 206 in either direction depending upon the direction in which dial 270 is rotated. This displacement of rack 202 shifts pin 200 along slot 192 to thus vary the effective lever arm length of link 194. In this way, the amount of displacement of plate 210 for a given magnitude of displacement of stem 146 may be varied selectively since the ratio of displacement of plate 210 is dependent on the lever arm distance between pin 200 and post 196. After dial 270 is adjusted, it may be clamped against inadvertent rotation by any suitable unshown means.

Dial 270 is advantageously provided with suitable graduations to accommodate the usual range of expansion rates encountered, but can be calibrated to suit any range of conditions. This naturally must be accompanied by the proper ratio of gearing between pinion 276 and rack 202.

From the foregoing description it will be appreciated that all of the parts of assembly 124 providing the operative connection between stem 146 and shaft 236 are located exteriorly of housing 22 and thus are exposed to facilitate easy and convenient assembly and disassembly. This exterior arrangement of assembly prevents metered fluid from contacting the motion transmitting parts so that their operation is not interfered with by adherence of foreign particles or by liquids that are relatively viscous. In addition, the parts of assembly 124, not being contacted by the fluid being metered, do not have to be made from more expensive material to accommodate the metering of corrosive fluids.

From the copending application Ser. No. 348,153, it will be noted that only a minor modification of the meter disclosed therein is required to incorporate the temperature compensating mechanism of this invention. This is especially advantageous in the manufacture of these meters since complete redesign is avoided and stock parts may be used to make the meter with or without the temperature compensating mechanism.

Furthermore, the temperature compensating mechanism of this invention is so constructed and arranged that it may easily be added to the meter at a later time in the form of an attachment. For example, the meter may be constructed with housing 130 and vane 126, and assembly 124 may optionally be added later on. The need for manufacturing two separate models of meters of appreciably different design in order to offer the consumer the option of taking temperature compensation thus may be avoided.

In addition to the foregoing adavntages, the temperature compensating mechanism incorporates three separate, independent adjustments which are readily accessible. When the manufacture of the meter is completed, it is tested with a fluid whose coefficient of expansion has been set on dial 270. Fluid is then circulated through the meter to stabilize fluid and bulb temperatures. Before testing, dial 158 is rotated to a position where two reference marks 280 and 281 (see FIGURE 2) respectively on pin 182 and plate 174 are aligned.

With reference marks 280 and 281 aligned, the adjustment vane 126 is in the position it would normally occupy when the fluid temperature is 60° F. The fluid temperature is then noted and if the temperature is above or below 60° F. the adjustment vane 126, must be repositioned by rotating dial 158 in the proper direction.

The graduations on dial 158 represent the number of degrees above and below the reference temperature. If, for example, the line temperature is 80° F., dial 158 would be turned clockwise 20 divisions as viewed from FIGURE 2. Screw 152 threads into arm 154 to rotate collar 160 and, consequently shaft 162 in a clockwise direction as seen from FIGURE 1. Link 186 is therefore displaced from left to right in FIGURES 2 and 9 to rotate link 194 in a clockwise direction as viewed from FIGURE 9. Clockwise displacement of link 194 shifts plate 210 to the right to turn the assembly of arm 234, shaft 236 and vane 126 in a counter-clockwise direction as viewed from FIGURE 2. By turning dial 158, vane 126 and all of the linkage connected between vane 126 and screw 152 are thus unitarily displaced relative to stem 146.

Test runs are made and line temperatures ascertained. The actual volume of fluid passed is then multiplied by the coefficient of expansion and the number of degrees of temperature above or below 60° F., and added to or subtracted from the actual volume, to obtain the equivalent volume at 60° F. The corrected volume is then compared with the quantity indicated on counter 52. Subsequent to each test, screw 260 is turned to selectively adjust vane 126 to a position where counter 52 provides the correct registration of the fluid at its reference temperature. This initial setting operation is done to provide the correct registration regardless of the vagaries of the meter. The bearings and other variable components are thus compensated for by screw 260.

Because of the large tolerance required by bulb manufacturers on the amount of stem projection 146, the adjustment vane 126 must be adjusted relative to the bulb stem 146, by means of adjustment dial 158 when the bulb is installed or replaced.

If doubt should arise as to the proper function of the meter or compensating mechanism, the reference marks 280 and 281 are aligned to move the linkage assembly 124 and vane 126 to the positions that these parts would have if the line fluid being metered were at the reference or base temperature. Linkage assembly 124 and vane 126 are then locked in these base temperature positions by any suitable, removable means. For example, plate 210 may be provided with an unshown notch which aligns with a blind bore in plate 174 when the linkage is in its base temperature position. An unshown pin inserted through this notch and into the aligning bore will thus hold the linkage and vane against displacement from their base temperature positions.

With the linkage and vane held in their base temperature positions, a proving run is made by allowing line fluid to flow through the metering housing. The actual volume passed should then agree with the reading on counter 52.

If the counter or meter register reading does not correspond to the quantity passed by the proving run, screw 260 is adjusted and the meter is rechecked. Once this adjustment is made, the pin locking the linkage and vane at their base temperature positions is removed, and dial 158 is turned to the temperature of the line fluid being metered. Another trial run is conducted, and the reading on counter 52 should now be correct as calculated for any temperature differential.

Recalibration of the meter in the manner described above may be required at the meter site as when bulb 122 is replaced since the new bulb or temperature sensing element may alter the calibration characteristics.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A fluid flow meter comprising a housing formed with inlet and outlet openings, a metering rotor rotatably supported in said housing to be driven by fluid flow therethrough, vane means mounted in said housing in the path of fluid approaching said rotor and being positionable to control the velocity of said rotor by controlling the angle of incidence which the fluid that enters the rotor makes with respect to the rotor, an element for sensing the temperature of fluid flowing through said housing, a motion transmitting linkage operatively connected between said element and said vane means for correlating the position of the latter with respect to the temperature sensed by the former, first means for selectively adjusting the position of said vane means relative to said linkage and said element, and second means for selectively and unitarily adjusting the position of linkage and said vane means relative to said element.

2. The fluid flow meter defined in claim 1 wherein said element has a part displaceable in response to sensed temperature variations and wherein said part is operatively connected to said linkage by said second means, the adjustment of said second means being effective to unitarily displace said linkage and said vane means relative to said part.

3. The fluid flow meter defined in claim 2 wherein said first means forms a part of a motion transmitting structure operatively connecting said linkage to said vane means.

4. The fluid flow meter defined in claim 2 wherein said first and second means respectively comprise first and second selectively displaceable members and wherein said members and said linkage are serially connected together to provide a motion transmitting path for imparting movement of said part to displace said vane means.

5. The fluid flow meter defined in claim 4 wherein each of said members comprises a screw element.

6. The fluid flow meter defined in claim 4 wherein said linkage comprises lever means for increasing the magnitude of displacement of said vane means relative to that of said part.

7. The fluid flow meter defined in claim 6 wherein said lever means has an adjustable lever arm length for varying the magnitude of displacement imparted to said vane means by said part and wherein means are provided for selectively adjusting said lever arm length.

8. The fluid flow meter defined in claim 4 wherein said linkage and said members are mounted out of the path of fluid flow and on the exterior of said housing.

9. A fluid flow meter comprising a housing formed with inlet and outlet openings, a meter rotor rotatably mounted in said housing to be driven by fluid flow therethrough, vane means mounted within said housing in the path of fluid approaching said rotor and being positionable to control the velocity of said rotor by controlling the angle of incidence which the fluid that enters the rotor makes with respect to the rotor, an element for sensing temperature variations of the fluid flowing through said housing, means on the exterior of said housing for providing a support surface, a motion transmitting plate mounted for rectilinear reciprocable, sliding movement on said support surface, means operatively connecting said element to said plate for rectilinearly sliding the latter in opposite directions in response to temperature variations sensed by the former, and means operatively connecting said plate to said vane means to transmit the rectilinear sliding motion of the former for positioning the latter.

10. The fluid flow meter defined in claim 9 comprising means carried by said plate for adjusting the magnitude of its motion in relation to the temperature variations sensed by said element.

11. The fluid flow meter defined in claim 9 wherein said vane means is so positioned by sensed temperature variations that the number of rotor revolutions is closely proportional to the volume that the measured fluid would have at a predetermined reference temperature and wherein said means operatively connecting said element to said plate comprises a part selectively manipulatable for adjusting said predetermined reference temperature.

12. The fluid flow meter defined in claim 9 wherein said means operatively connecting said plate to said vane means comprises a selectively manipulatable part for adjusting the position of said vane means relative to said plate.

13. The fluid flow meter defined in claim 12 comprising means mounting said vane means for swinging movement about an axis normally intersecting the rotor rotational axis.

14. The fluid flow meter defined in claim 12 wherein said part is mounted on said plate for movement therewith.

15. The fluid flow meter defined in claim 14 wherein said means operatively connecting said plate to said vane means further comprises a member having a portion slidably extending between said support surface and said plate and being fixed to said part, an arm connected to said vane means and means operatively connecting said member to said arm to impart reciprocation of said plate for turning the assembly of said arm and vane means in opposite directions.

16. The fluid flow meter defined in claim 9 wherein said means operatively connecting said element to said plate comprises a motion transmitting link seated in a recess formed in said support surface, said plate being slidable over said recess.

17. The fluid flow meter defined in claim 9 wherein said element comprises a motion transmitting part which is reciprocated in response to sensed temperature variations, and wherein said means operatively connecting said element to said plate comprises a pivotable lever, means operatively connecting said part to pivot said lever, and means operatively connecting said lever to reciprocate said plate.

18. The fluid flow meter defined in claim 17 wherein said lever is mounted between said plate and said surface and wherein means carried by said plate is effective to selectively vary the ratio of movement of said plate to said part by varying the effective length of said lever.

19. The fluid flow meter defined in claim 1 comprising indicia means associated with said second means for indicating when said vane means and said linkage have been moved by operation of said second means to positions corresponding to the actual measured temperature of the fluid flowing through said housing to facilitate meter calibration by adjusting said vane means with said first means to a position where a correct meter registration of fluid flow is obtained.

20. The fluid flow meter defined in claim 19 wherein said indicia means comprises a temperature scale coacting with a reference mark.

21. The fluid flow meter defined in claim 1 wherein said first and second means respectively have first and second members connected to said linkage for displacement therewith in response to temperature variations sensed by said element.

22. The fluid flow meter defined in claim 21 comprising third means operatively connected to said linkage between the points of connection to said first and second members and providing a separate selective adjustment for measuring flow of fluids with different rates of coefficients of expansion.

References Cited

UNITED STATES PATENTS

| | | | |
|---|---|---|---|
| 2,961,874 | 11/1960 | Granberg | 73—230 |
| 3,060,740 | 10/1962 | Granberg | 73—230 |
| 3,199,349 | 8/1965 | Silvern | 73—233 |

FOREIGN PATENTS

| | | |
|---|---|---|
| 178,123 | 6/1966 | U.S.S.R. |
| 942,113 | 11/1963 | Great Britain. |

RICHARD C. QUEISSER, *Primary Examiner.*

EDWARD D. GILHOOLY, *Assistant Examiner.*